(12) United States Patent
Bickerstaff (10) Patent No.: US 8,589,230 B1
(45) Date of Patent: Nov. 19, 2013

(54) CROWD SPECIFIC TARGETED ADVERTISING

(75) Inventor: Ryan M. Bickerstaff, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 323 days.

(21) Appl. No.: 13/035,795

(22) Filed: Feb. 25, 2011

(51) Int. Cl.
*G06Q 10/00* (2012.01)

(52) U.S. Cl.
USPC .................. 705/14.58; 705/14.63; 705/14.49; 705/14.4; 725/32

(58) Field of Classification Search
USPC ................................ 705/14, 14.58; 340/425.5
See application file for complete search history.

(56) References Cited

U.S. PATENT DOCUMENTS

| | | | |
|---|---|---|---|
| 6,545,596 B1 * | 4/2003 | Moon | 340/425.5 |
| 2008/0052171 A1 * | 2/2008 | Eldering | 705/14 |
| 2009/0076894 A1 * | 3/2009 | Bates et al. | 705/14 |

FOREIGN PATENT DOCUMENTS

JP   2011008751 A   *   1/2011

* cited by examiner

*Primary Examiner* — James A Reagan
(74) *Attorney, Agent, or Firm* — Osha Liang LLP (57) ABSTRACT

A method for placing targeted advertisement (TAD), including obtaining, from a location aware service provider, current locations of mobile devices used by consumers, wherein the current locations are determined within a pre-determined duration of current time, identifying a crowd comprising the consumers by comparing the current locations and a location of an advertisement presentation device to determine that the consumers are currently within a pre-determined range of the advertisement presentation device, calculating, based on profiles of the consumers, a relevancy score of a TAD message with respect to the crowd using a pre-determined formula, and sending, within a pre-determined time of identifying the crowd and in response to identifying the relevancy score meeting a pre-determined criterion, the TAD message to the advertisement presentation device for presenting to the plurality of consumers.

17 Claims, 4 Drawing Sheets

CROWD SPECIFIC TARGETED ADVERTISING

BACKGROUND

Targeted advertising is a type of advertising whereby advertisements are placed so as to reach a consumer based on various characteristics of a single individual consumer, such as demographics, purchase history, or observed behavior. For example, behavioral targeting uses information collected on an individual's web-browsing behavior, such as the pages visited or the searches performed, to select which advertisements to display to that particular individual. Behavioral targeting allows website owners or advertisement networks to display content more relevant to the interests of the individual viewing the web page. In another example, a contextual advertising system scans the text of a website for keywords and returns advertisements to the webpage based on what the individual consumer is viewing. For example, if the consumer is viewing a website pertaining to sports and that website uses contextual advertising, the individual consumer may see advertisements for sports-related companies, such as memorabilia dealers or ticket sellers.

Location-aware service (LAS) is an information service, accessible using mobile devices through the mobile phone network and utilizing the built-in ability of the mobile device and the mobile network to track the geographical position of the user. Examples of LAS include services to discover the nearest banking cash machine, personalized weather services, location-based games, etc.

SUMMARY

In general, in one aspect, the invention relates to a method for placing targeted advertisement (TAD), the method includes obtaining, from a location aware service (LAS) provider, a plurality of current locations of a plurality of mobile devices used by a plurality of consumers, wherein the plurality of current locations are determined by the LAS provider within a pre-determined duration of current time, identifying a crowd comprising the plurality of consumers by comparing, using a processor of a computer system, the plurality of current locations and a location of an advertisement presentation device to determine that the plurality of consumers are currently within a pre-determined range of the advertisement presentation device, calculating, by the processor based on a plurality of profiles of the plurality of consumers, a relevancy score of a TAD message with respect to the crowd using a pre-determined formula, and sending, within a pre-determined time of identifying the crowd and in response to identifying the relevancy score meeting a pre-determined criterion, the TAD message to the advertisement presentation device for presenting to the plurality of consumers.

In general, in one aspect, the invention relates to a system for placing targeted advertisement (TAD). The system includes an advertisement presentation device configured to present a TAD message, a plurality of mobile devices used by a plurality of consumers and configured to receive location aware service (LAS) from a LAS provider, a TAD target locator executing on a processor and configured to obtain a plurality of current locations of the plurality of mobile devices from the LAS provider, wherein the plurality of current locations are determined by the LAS provider within a pre-determined duration of current time and identify a crowd comprising the plurality of consumers by comparing the plurality of current locations and a location of the advertisement presentation device to determine that the plurality of consumers are currently within a pre-determined range of the advertisement presentation device, a TAD agent executing on the processor and configured to calculate, based on a plurality of profiles of the plurality of consumers, a relevancy score of a TAD message with respect to the crowd using a pre-determined formula and send, within a pre-determined time of identifying the crowd and in response to identifying the relevancy score meeting a pre-determined criterion, the TAD message to the advertisement presentation device for presenting to the plurality of consumers, and a repository for storing the plurality of profiles and the TAD message.

In general, in one aspect, the invention relates to a computer readable storage medium storing instructions for placing targeted advertisement (TAD) based on a current location of a consumer using a mobile device. The instructions, when executed, includes functionality to obtain, from a location aware service (LAS) provider, a plurality of current locations of a plurality of mobile devices used by a plurality of consumers, wherein the plurality of current locations are determined by the LAS provider within a pre-determined duration of current time, identify a crowd comprising the plurality of consumers by comparing, using a processor of a computer system, the plurality of current locations and a location of an advertisement presentation device to determine that the plurality of consumers are currently within a pre-determined range of the advertisement presentation device, calculate, based on a plurality of profiles of the plurality of consumers, a relevancy score of a TAD message with respect to the crowd using a pre-determined formula, and send, within a pre-determined time of identifying the crowd and in response to identifying the relevancy score meeting a pre-determined criterion, the TAD message to the advertisement presentation device for presenting to the plurality of consumers.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for placing a targeted advertisement (TAD) message based on statistical profiles of consumers in a crowd. Specifically, a service aggregates characteristics from profiles of mobile device (e.g., mobile phone) owners currently present in a specific area and generates the most relevant advertisement to be presented in the area. In particular, the most relevant advertisement is expected to result in the highest conversion rate based on historical data and/or result in the highest fee an advertiser is willing to pay to deliver to a particular demographic associated with the currently present mobile device owners.

In one or more embodiments of the invention, a database on a server keeps track of a mobile device ID (e.g., a mobile phone number or electronic serial number) and profile information containing characteristics (i.e., gender, interests, etc.) of the owner of that mobile device. Personally identifiable information (e.g., name) is not required and the characteristics can be updated periodically (not necessarily in real-time). Further, mobile device locations may be captured in real-time from a location aware service (LAS) accessed by the mobile devices. Generally, users (i.e., mobile device owners) will need to be incentivized to share their location and profile information. This could be part of the terms of service for an application used by the user or the user may gain rewards by allowing the information to be disseminated. Throughout this disclosure, the terms mobile "device owner," "user," and "consumer" may be used interchangeably depending on the context.

An example of a crowd is in a movie theater before the movie begins. Advertisements for a high end retailer or a low end retailer may be selected and displayed on the movie screen depending on the real-time demographic in the movie audience. Another example is an advertisement displayed on a digital billboard and viewed by people when waiting in line at an amusement park. The interests and backgrounds of people going on the rides can change through the day, hour, or even minute. Relevant advertisements may be rotated to match the specific audience at any point in time. In yet another example, the TAD can be anticipatory. For example, traffic is traveling at 30 mph and a group of people will arrive at a destination in approximately 5 minutes. A roadside digital billboard can be updated just in advance of their arrival, or a series of billboards can be linked together to provide an overall advertising strategy as the crowd passes through an area.

Figure 1:
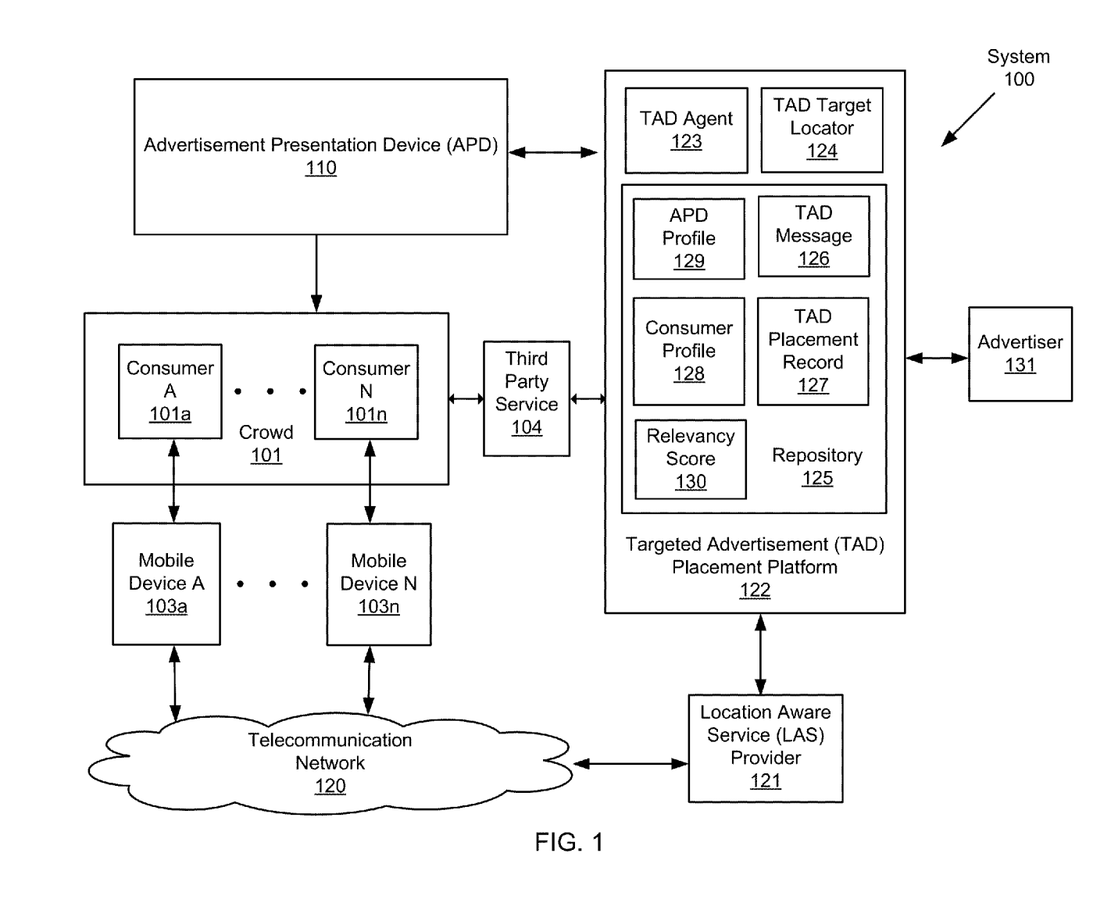
FIG. 1 shows a schematic diagram of a system for placing targeted advertisement (TAD) based on statistical profiles of consumers in a crowd in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a TAD placement system in accordance with embodiments disclosed herein.

As shown in FIG. 1, the system (100) includes consumer A (101a), consumer N (101n), etc. forming a crowd (101), advertisement presentation device (110) perceptible (e.g., visible, audible, etc.) by the crowd (101), targeted advertisement (TAD) placement platform (122), third party service (104), and LAS provider (121). In particular, the consumer A (101a) and consumer N (101N) use mobile device A (103a) and mobile device N (103n), respectively (e.g., a smart phone, netbook computer, or other mobile computing/communication device) to access service from the LAS provider (121) via telecommunication network (120). For example, the telecommunication network (120) may include mobile phone network, WIFI, or any other suitable wireless communication network.

Further as shown in FIG. 1, the TAD placement platform (122) is used by advertiser (131) to deliver customized TAD messages (e.g., TAD message (126)) via the advertisement presentation device (110). Generally, the advertisement presentation device (110) may be configured in many different ways. In one or more embodiments of the invention, the advertisement presentation device (110) includes a digital billboard that is configured to receive and present customized TAD messages (e.g., TAD message (126)) in various formats, such as a static graphic display, a slideshow, or a multimedia message having video and audio contents. In one or more embodiments, the advertisement presentation device (110) includes a public announcement system that is configured to receive and present customized TAD messages (e.g., TAD message (126)) as an audio only message.

Further as shown in FIG. 1, TAD placement platform (122) includes TAD agent (123), TAD target locator (124), and repository (125). The repository (125) may be a database, persistent storage, or any other suitable type of storage device for storing APD (advertisement presentation device) profile (129) of the advertisement presentation device (110), consumer profiles (e.g., consumer profile (128)) of consumers (e.g., consumer A (101a), consumer N (101n)), TAD messages (e.g., TAD message (126)), TAD placement records (e.g., TAD placement record (127)), and relevancy scores (e.g., relevancy score (130)) of TAD messages (e.g., TAD message (126)).

In one or more embodiments of the invention, the TAD target locator (124) is configured to identify a crowd (e.g., crowd (101) made up of consumer A (101a), consumer N (101n), etc.) in the vicinity of the advertisement presentation device (110) by comparing current locations of consumer mobile devices (e.g., mobile device A (103a) and mobile device N (103n)) and a location of the advertisement presentation device (110) to identify those consumers who are currently within a pre-determined range of the advertisement presentation device (110).

In one or more embodiments, location information of the mobile devices (e.g., mobile device A (103a) and mobile device N (103n)) may be coarse grained (e.g., a tenth of mile/km or more), such as based on cellular zone of the telecommunication network (120). In such embodiments without precise resolution of location information, the predetermined range defining the crowd (101) is based on the particular cellular zone where the advertisement presentation device (110) is located. In one or more embodiments, location information of the mobile devices (e.g., mobile device A (103a) and mobile device N (103n)) may be fine grained (e.g., less than a tenth of mile/km), such as based on GPS coordinates of the mobile device. In such embodiments with more precise resolution of location information, the pre-determined range defining the crowd (101) may be determined based on reception quality measures (e.g., visibility, audibility, perceptibility, etc.) at various locations near the advertisement presentation device (110) such that TAD messages (e.g., TAD message (126)) presented by the consumers advertisement presentation device (110) can be received (e.g., viewed, heard, or otherwise perceived) by the crowd (101) clearly. In one or more embodiments, such pre-determined range may be determined by measuring reception quality (e.g., visibility, audibility, perceptibility, etc.) under various weather conditions for comparing to a predetermined threshold. In one or more embodiments, such pre-determined range may include distances as a function of direction (e.g., viewing angle) from the advertisement presentation device (110). In one or more embodiments, reception quality may be a function of relative position from the advertisement presentation device (110) due to influences from distance, viewing angle, line-of-sight obstacles, etc. In one or more embodiments, information relating to such pre-determined range and reception quality is stored as APD profile (129) in the repository (125).

In one or more embodiments, the TAD target locator (124) is configured to obtain current locations of consumer mobile devices (e.g., mobile device A (103*a*) and mobile device N (103*n*)) from the LAS provider (121). For example, consumers (e.g., consumer A (101*a*), consumer N (101*n*)) in the crowd (101) may be accessing or have accessed the LAS provider (121) to obtain information or service (e.g., weather information, navigation service, etc.) related to their current location. Accordingly, their current locations are tracked by the LAS provider (121) based on the cellular phone number or electronic serial number of the mobile devices (e.g., mobile device A (103*a*) and mobile device N (103*n*)) for delivering the requested information or service. For example, the location may be determined by the LAS provider (121) based on GPS coordinates transmitted from a GPS equipped mobile device or based on information available from the telecommunication network (120) identifying a particular cellular zone within which the mobile device accesses the telecommunication network (120). In one or more embodiments, location tracking by the LAS provider (121) may be initiated upon receiving a request for the information service and continues until specifically terminated subsequent to completing the information service. In one or more embodiments, these current locations are updated by the LAS provider (121) in real time and remain current within a time window of pre-determined duration.

In one or more embodiments of the invention, the TAD agent (123) is configured to place advertisement by selecting TAD messages (e.g., TAD message (126)) for the crowd (101) identified by the TAD target locator (124) and presenting the selected TAD messages (e.g., TAD message (126)) to the crowd (101) using the advertisement presentation device (110).

In one or more embodiments, the TAD agent (123) is configured to calculate a relevancy score (130) of the TAD message (126) with respect to the crowd (101) using a pre-determined formula. In particular, the relevancy score (130) represents a statistical measure of importance of the TAD message (126) with respect to the interests of consumers (e.g., consumer A (101*a*), consumer N (101*n*)) in the crowd (101). In one or more embodiments, the relevancy score (130) is calculated based on profiles (e.g., consumer profile (128)) of the consumers (e.g., consumer A (101*a*), consumer N (101*n*)) in the crowd (101). Specifically, attribute values in the consumer profile (128) are used in calculating the relevancy score (130). For example, the consumer profile (128) may include attributes of a consumer (e.g., consumer A (101*a*), consumer N (101*n*)) representing characteristics (e.g., income range, profession, hobby, interest, gender, age group, or other demographic information) of such consumer. In one or more embodiments, the consumer profile is organized based on an individual consumer basis. For example, consumer profile (128) may include attributes of a single consumer (e.g., consumer A (101*a*) or consumer N (101*n*)).

In one or more embodiments, the consumer profiles (e.g., consumer profile (128)) may be identified based on the cellular phone number or electronic serial number of the mobile devices (e.g., mobile device A (103*a*) and mobile device N (103*n*)) used by the consumers (e.g., consumer A (101*a*), consumer N (101*n*)) and may be obtained from the LAS provider (121) or a third party service (104) used by the consumers (e.g., consumer A (101*a*), consumer N (101N)). For example, the consumers may be asked to provide demographic or other personal information when signing up to access information or use the service provided by the LAS provider (121) or the third party service (104). Examples of the third party service (104) include both online websites and traditional merchants, such as retail chain stores, mail order service, etc.

Generally, different attributes in the consumer profile (128) may have different significance relating to the relevancy of an advertisement. For example, relevancy of an advertisement targeting the youth market is more sensitive to the age group attributes of the crowd (110) than the profession attributes of the crowd (110). In one or more embodiments, the TAD agent (123) is configured to receive, from an advertiser (e.g., advertiser (131)), a number of relevancy weightings each representing relevancy of an attribute in the consumer profile (128) with respect to the advertising focus of the advertiser. For example, such relevancy weightings may be applicable to all advertisements of the advertiser (131), to a particular bundle of advertisements of the advertiser (131), or to a single advertisement (e.g., the TAD message (126)) of the advertiser (131). Accordingly, the pre-determined formula for calculating the relevancy score (130) may be formulated, for example by the TAD agent (123), based on the relevancy weightings. In one or more embodiments, the pre-determined formula may include summation of attributes in the consumer profiles (e.g., consumer profile (128)), weighted by relevancy weightings and calculated for each consumer (e.g., consumer A (101*a*), consumer N (101*n*)) in the crowd (101). An example formula is described in reference to FIG. 3 below.

Generally, different consumers in the crowd (101) may experience different reception quality of the TAD message (126) presented by the advertisement presentation device (110). For example, the reception quality may depend on the relative distance, viewing angle, line-of-sight blocking obstacles, etc. of the consumer to the advertisement presentation device (110). Accordingly, a consumer situated at a position (or location) with better reception quality may be weighted higher in calculating the relevancy score (130). In one or more embodiments when fine grained consumer location information is available, the TAD agent (123) is configured to adjust the pre-determined formula for calculating the relevancy score (130) by considering reception quality experienced by each consumer in the crowd (110) based on the consumer's relative position with respect to the advertisement presentation device (110). In one or more embodiments, the TAD agent (123) is configured to obtain reception quality measures of the advertisement presentation device (110) at various positions within the pre-determined range, as identified in the APD profile (129). Accordingly, the pre-determined formula may be adjusted by the TAD agent (123) based on the APD profile (129). For example, in addition to individual attributes being weighted by the advertiser provided relevancy weightings, contributions of consumer profiles (e.g., consumer profile (128)) to the relevancy score (130) are further weighted based on reception quality, as defined in the APD profile (129), experienced by each consumer in the crowd (101) based on the particular consumer's relative position to the advertisement presentation device (110).

Generally, some advertisements may be more effective when it is presented repetitively to a consumer while other advertisements may be less effective if presented too many times to the same consumer. For example, advertisement effectiveness may be represented as an empirical function of the number of times the consumer has been presented with the advertisement. In one or more embodiments, the TAD agent (123) is configured to log, in the TAD placement record (127), the consumers (e.g., consumer A (101a), consumer N (101n)) in the crowd (101) upon presenting the TAD message (127). Accordingly, the TAD placement record (126) tracks the number of times each consumer (e.g., consumer A (101a), consumer N (101n)) has been presented the TAD message (126). In one or more embodiments, the TAD agent (123) is configured to adjust the pre-determined formula for calculating the relevancy score (130) based on the TAD placement record (127) and the empirical function. Specifically, contribution of the each of the consumer profiles (e.g., consumer profile (128)), associated with the crowd (101), to the relevancy score (130) is adjusted using the empirical function based on the TAD placement record (127) according to the number of times that the corresponding consumer has been presented the TAD message (126). For example, the empirical function associated with the TAD message (126) may be provided by the advertiser (131).

Once the relevancy score (130) is calculated for the TAD message (126), the TAD agent (123) is configured to select the TAD message (126) for presenting to the consumers (e.g., consumer A (101a), consumer N (101n)) based on a pre-determined criterion. In one or more embodiments, the TAD message (126) is selected if the relevancy score (130) exceeds a pre-determined threshold. In one or more embodiments, the TAD message (126) is selected if the relevancy score (130) is a maximum relevancy score among a group of TAD messages. In one or more embodiments, multiple TAD messages with relevancy scores ranked at top positions in a group of TAD messages may be selected.

Generally, consumers (e.g., consumer A (101a), consumer N (101n)) congregate in an area to form a crowd (e.g., crowd (101)) that lasts only a limited time span. In one or more embodiments, the TAD agent (123) is configured to send the selected TAD message(s) (e.g., TAD message (126)) to the advertisement presentation device (110) for presenting to the consumers (e.g., consumer A (101a), consumer N (101n)) within a pre-determined time span immediately subsequent to the TAD target locator (124) identifying the crowd (101).

In one or more embodiments of the invention, the advertiser (131) may be any business operation (e.g., store, restaurant, personal service provider, consulting firm, online merchant, insurance agency, repair service, etc.) or an individual that engages in retail activities (e.g., offering products or service for sale) targeting the consumers (e.g., consumer A (101a), consumer N (101n)). In one or more embodiments, the advertiser (131) provides a group of TAD messages (e.g., TAD message (126)) to the TAD placement platform (122) to be selectively presented based on dynamically determined statistical characteristics of a crowd (e.g., crowd (101)) congregating in the vicinity of the advertisement presentation device (110). From time to time, the group of TAD messages (e.g., TAD message (126)) may be updated, supplemented, or otherwise modified by the advertiser (131) on a regular basis.

In one or more embodiments of the invention, the TAD placement platform (122) has access to consumer profile information based on business agreements established with the LAS provider (121) and/or the third party service (104). In one or more embodiments, the TAD placement platform (122) may be a hosted application on the web or a software-as-a-service (SaaS) offering from an application service provider that is separate from the LAS provider (121) and/or the third party service (104). In one or more embodiments, the TAD placement platform (122) may be integrated with or a portion of the LAS provider (121) and/or the third party service (104).

Although not specifically described above, it is contemplated that the relevancy score (130) may be extended to be a function of which advertisement will generate the most revenue for the advertiser (131) or the TAD placement platform (122). For example, probability of purchases induced by TAD message (126) may be modeled for each of the consumers (e.g., consumer A (101a), consumer N (101n)) to estimate the incremental revenue for the advertiser (131). The TAD placement platform (122) may also benefit from such incremental revenue based on certain business arrangements.

Figure 2:
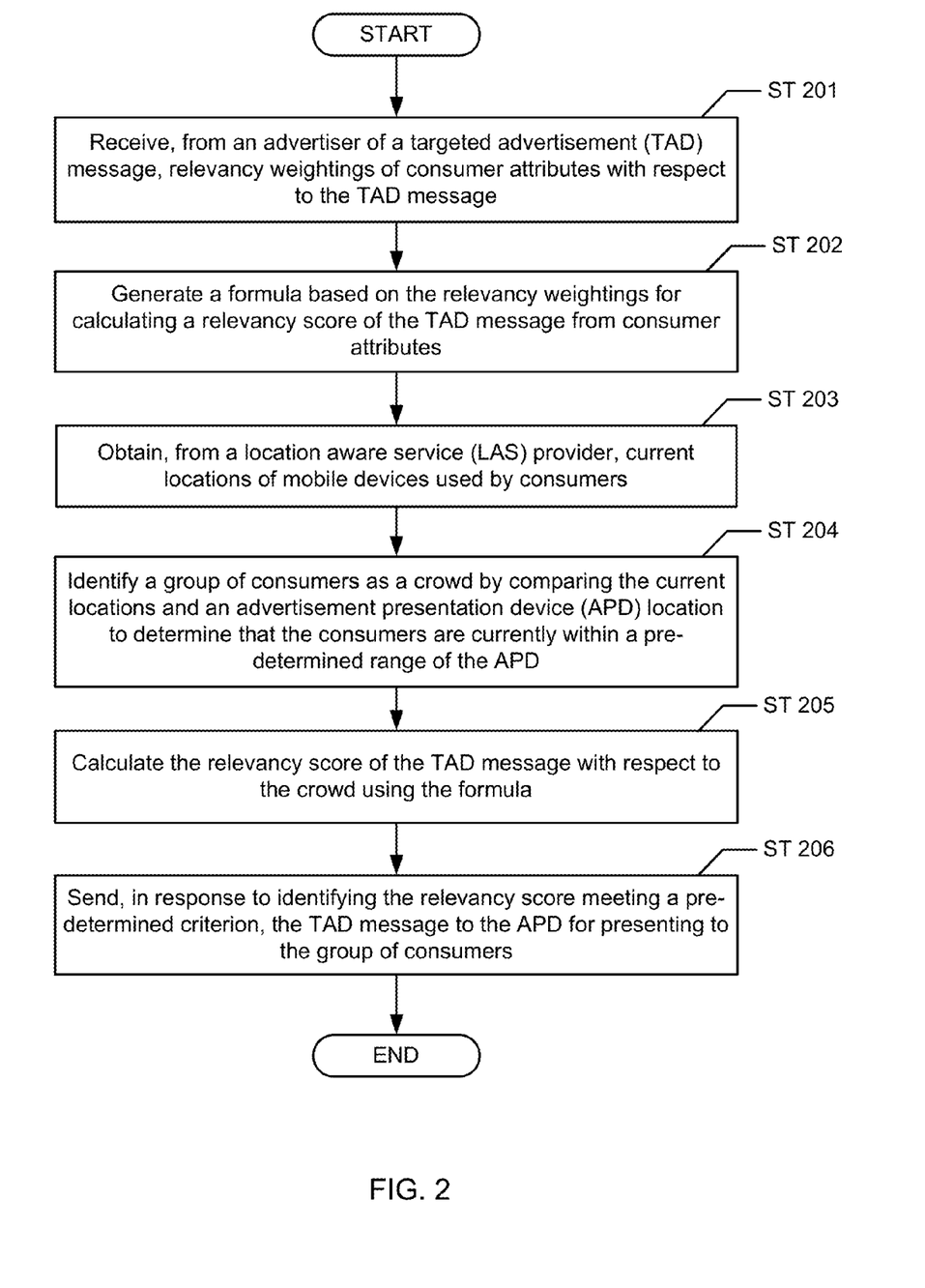
FIG. 2 shows a flowchart of a method for placing TAD based on statistical profiles of consumers in a crowd in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

As noted above, the method directs to presenting a targeted advertisement (TAD) message of an advertiser to a group of consumers (i.e., a crowd) when it is determined that the consumers are in proximity to an advertisement presentation device (e.g., a digital billboard or a public announcement system) based on current consumer locations obtained from a location based service (LAS) or other third party services currently being used by the consumers.

Initially in Step 201, relevancy weightings of consumer attributes are received from an advertiser of the TAD message. As described above, each of the relevancy weightings represents relevancy of an attribute in a consumer profile with respect to the TAD message. In particular, each attribute represents a characteristic (e.g., income range, profession, hobby, interest, gender, age group, or other demographic information) of the consumer.

In Step 202, a pre-determined formula is generated based on the relevancy weightings for calculating a relevancy score of the TAD message with respect to a crowd. In one or more embodiments, the pre-determined formula calculates the relevancy score from consumer attributes associated with the crowd. Generally, different attributes in a consumer profile may have different significance relating to the relevancy of an advertisement. As noted above in an example, relevancy of an advertisement targeting the youth market is more sensitive to the age group attribute of the crowd than the profession attribute of the crowd. In one or more embodiments, the pre-determined formula may include summation of attributes in the consumer profiles, weighted by relevancy weightings and calculated for each consumer in the crowd. An example formula is described in reference to FIG. 3 below.

In Step 203, current locations of mobile devices used by a group of consumers are obtained. In one or more embodiments, the current locations are obtained from a location aware service (LAS) provider providing information service (e.g., weather information, navigation service, etc.) to the group of consumers. In particular, the current locations may include GPS coordinates transmitted by GPS equipped mobile devices or cellular zone information available from mobile phone network indicating where the mobile devices are accessing the mobile phone network. Generally, these current locations are determined and updated by the LAS provider within a pre-determined duration preceding the current time. In one or more embodiments, the current locations of the mobile devices represent the current locations of the consumers.

In Step 204, the group of consumers is identified as a crowd by comparing their current locations and a location of an advertisement presentation device (APD) to determine that the group of consumers is currently within a pre-determined range of the advertisement presentation device. In one or more embodiments, an APD profile may be determined by measuring reception quality of advertisement presentation in the vicinity of the advertisement presentation device. For example, the reception quality may represent visibility, audibility, perceptibility, etc. of TAD messages presented by the advertisement presentation device as a function of relative position with respect to the advertisement presentation device. In particular, the reception quality may be affected by distance, viewing angle, line-of-sight obstacles of a position relative to the advertisement presentation device. In one or more embodiments when fine grained consumer location information (e.g., based on GPS coordinates) is available, the crowd is identified to include those consumers located at positions near the advertisement presentation device where the reception quality exceeds a pre-determined threshold such that those consumers in the crowd can view, listen, or perceive the TAD message clearly. In one or more embodiments when only coarse grained consumer location information (e.g., based on cellular zones) is available, it is assumed that those consumers within the same or adjacent cellular zone(s) where the advertisement presentation device is located are able to receive the presented TAD message.

In Step 205, a relevancy score of the TAD message with respect to the identified crowd is calculated based on consumer profiles of the consumers in the crowd using the pre-determined formula generated in Step 202 above. Specifically, attribute values in the consumer profiles are used in calculating the relevancy score. In one or more embodiments, the consumer profiles may be identified based on the cellular phone number or electronic serial number of the mobile devices used by the consumers and may be obtained from the LAS provider or a third party service (e.g., online websites or traditional merchants, such as retail chain stores, mail order service, etc.) used by the consumers. For example, the consumers may be asked to provide demographic or other personal information when signing up to access information or use the service provided by the LAS provider or the third party service.

In one or more embodiments when fine grained consumer location information (e.g., based on GPS coordinates) is available, the relevancy score may be adjusted by adjusting the pre-determined formula based on the APD profile. For example, contribution of each consumer profile to the relevancy score is adjusted based on reception quality measure, stored in the APD profile, at the relative position where the consumer is located with respect to the application presentation device. In such manner, the consumer at a position with high reception quality will be weighted more heavily in calculating the relevancy score than the other consumer at another position with relatively lower reception quality.

In one or more embodiments, the relevancy score may be adjusted by adjusting the pre-determined formula based on a TAD placement record tracking the number that each consumer has been presented the TAD message. For some TAD message that is more effective with repetitive presentation, those consumers who have been presented the TAD message before will be weighted more heavily in calculating the relevancy score than other consumers who has less exposure to the same TAD message. For other TAD message that is less effective with repetitive presentation, those consumers who have been presented the TAD message before will be weighted less heavily in calculating the relevancy score than other consumers who has less exposure to the same TAD message.

In Step 206, the relevancy score of the TAD message is analyzed based on a pre-determined criterion to determine if the TAD message is sufficiently relevant for presenting the crowd. If the TAD message is determined to be sufficiently relevant and selected to be presented, it is sent to the advertisement presentation device for presenting to the consumers in the crowd within a pre-determined time span from when the crowd is identified prior to the crowd has a chance to change its composition substantially rendering the relevancy score inapplicable. In one or more embodiments, the pre-determined criterion is based on the relevancy score exceeding a pre-determined threshold. In one or more embodiments, the pre-determined criterion is based on the relevancy score being a maximum relevancy score among a group of TAD messages. In one or more embodiments, the pre-determined criterion may select multiple TAD messages with relevancy scores ranked at top positions in a group of TAD messages.

Figure 3:
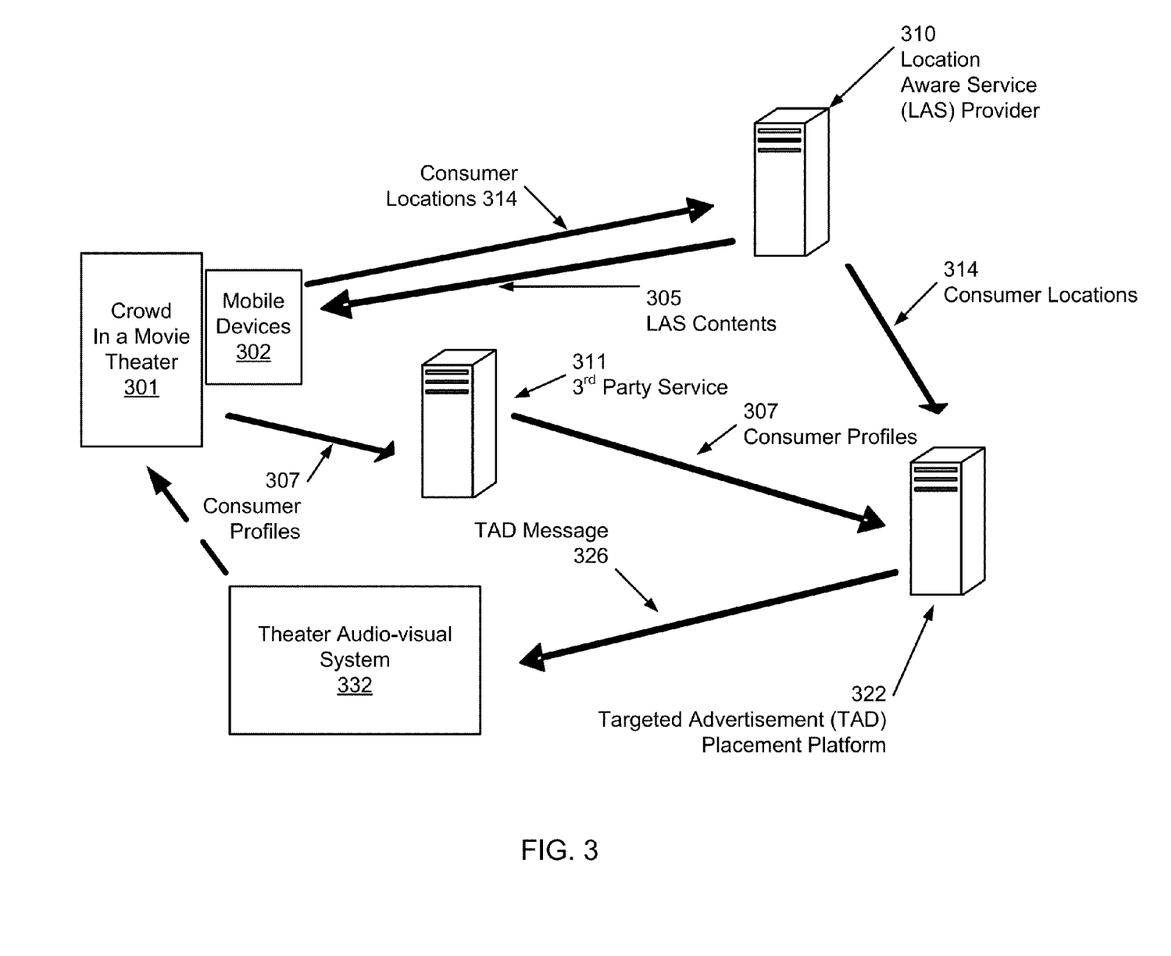
FIG. 3 shows an example of placing TAD based on statistical profiles of consumers in a crowd in accordance with one or more embodiments of the invention.

FIG. 3 shows an application example in accordance with one or more embodiments of the invention. This example application may be practiced using the system (100) of FIG. 1 and based on the method described with respect to FIG. 2 above.

As shown in FIG. 3, a group of consumers is identified by the target advertisement (TAD) placement platform (322) as being in a movie theater forming a crowd (301). As described above, the crowd (301) is identified based on information obtained from one or more location aware service (LAS) provider(s) (310) regarding current locations (314) of the mobile devices (302) used by the consumers to query LAS content (305), such as local weather information and/or other location based service from such one or more LAS provider(s) (310). While accessing the service of the LAS provider(s) (310), the consumer location information (314) becomes available to the LAS provider(s) (310). In addition, consumer profiles (307) of the consumers in the crowd (301) may have been established at one or more third party service(s) (311) used by the consumers in the crowd (301). Based on agreed upon consumer privacy policies of the one or more LAS provider(s) (310) and the third party service(s) (311), and certain business arrangements, the consumer location information (314) and the consumer profiles (307) may be provided to the TAD placement platform (322). The TAD placement platform (322) calculates an advertisement relevancy score with respect to the crowd (301) based on the consumer profiles (307). Based on the calculated relevancy score, the TAD placement platform (322) identifies the TAD message (326) as most relevant among a list of advertisement messages to be presented to the crowd (301). Accordingly, the TAD message (326) is sent to the theater audio-visual system (332) for presenting to the crowd (301) in time before consumers in the crowd (301) have a chance to disseminate.

A mathematical formula for calculating the relevancy score is described below. Let $V_{xi}$ represent relevancy of an advertisement x that is a function of attributes $a_i$ of a consumer i:

$V_{xi}(a_1, a_2, \ldots, a_n)$, where n is the total number of attributes in the consumer profile.

As described above, the most relevant advertisement in a set of advertisements (numbered 1 through X) for consumers (numbered 1 through D) in a crowd may be selected by identifying the maximum relevancy score among the set of advertisements:

$$\text{MAX}(\Sigma_{i=1 \text{ to } D} V_{li}(a_1, \ldots, a_n), \ldots, \Sigma_{i=1 \text{ to } D} V_{xi}(a_1, \ldots, a_n)),$$

where D=number of consumers in the crowd, $V_{xi}$=relevancy of advertisement x for consumer i, $a_n$=an attribute.

As an example, a movie theater with audio-visual system (332) has five persons (301) in the audience. In addition, each consumer profile (307) of these five persons (301) includes three attributes $a_1$=male, $a_2$=female, $a_3$=Probability-To-shop-At-High-End-Retailers. For example, $a_1$=1, $a_2$=0, $a_3$=0 for a male that identifies himself as never shopping at high end retailer stores. In another example, $a_1$=0, $a_2$=1, $a_3$=1 for a female that identifies herself as a regular shopper at high end retailer stores. In yet another example, $a_1$=0, $a_2$=1, $a_3$=0.5 for a female that identifies herself as sometime shopping at high end retailer stores.

In the example, the movie theater has four possible advertisements to choose from for presenting to the audience (301) prior to playing the feature movie, namely: advertisement 1 promoting a purse offered by the retail store Nordstrom, advertisement 2 promoting a tie offered by the retail store Nordstrom, advertisement 3 promoting a purse offered by the retail store Old Navy, and advertisement 4 promoting a tie offered by the retail store Old Navy. A marketing survey firm has determined several formulas for calculating the advertisement relevancy score as below:

Nordstrom Purse: $V_1 = a_2 + 0.8 a_3$

Nordstrom Tie: $V_2 = a_1 + 0.8 a_3$

Old Navy Purse: $V_3 = a_2 + 0.2 a_3$

Old Navy Tie: $V_4 = a_1 + 0.2 a_3$

Attribute values for these five persons (301) in the movie theater has been obtained from marketing survey as the table below:

|  | $a_1$ | $a_2$ | $a_3$ |
|---|---|---|---|
| Person 1 | 1 | 0 | 0.8 |
| Person 2 | 1 | 0 | 0.1 |
| Person 3 | 0 | 1 | 0.9 |
| Person 4 | 0 | 1 | 0.7 |
| Person 5 | 0 | 1 | 0.3 |

Relevancy of each of the four advertisements for each of these five persons are calculated as below using the formulas and the attributes values above:

|  | $V_1$ | $V_2$ | $V_3$ | $V_4$ |
|---|---|---|---|---|
| Person 1 | 0.64 | 1.64 | 0.16 | 1.16 |
| Person 2 | 0.08 | 1.08 | 0.02 | 1.02 |
| Person 3 | 1.72 | 0.72 | 1.18 | 0.18 |
| Person 4 | 1.56 | 0.56 | 1.14 | 0.14 |
| Person 5 | 1.24 | 0.24 | 1.06 | 0.06 |
| Summation | 5.24 | 4.24 | 3.56 | 2.56 |

It can be seen that advertisement 1 (326) promoting the Nordstrom Purse has the maximum relevancy score of 5.24 and therefore is selected to be presented on the movie theater's audio-visual system (332).

Figure 4:
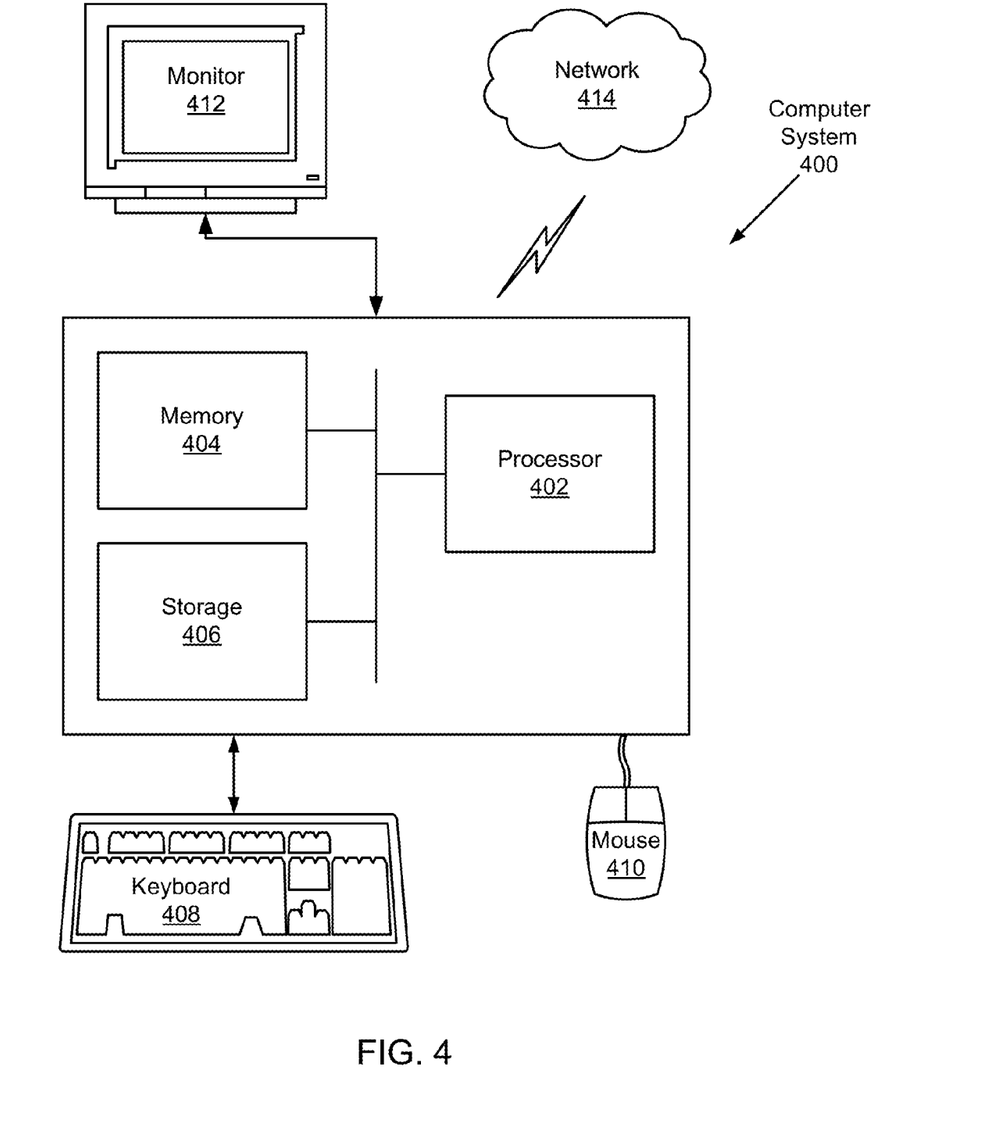
FIG. 4 shows a diagram of a computer in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various elements of the TAD placement platform (122)) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for placing targeted advertisement (TAD), comprising:

obtaining, from a location aware service (LAS) provider, a plurality of current locations of a plurality of mobile devices used by a plurality of consumers, wherein the plurality of current locations are determined by the LAS provider within a pre-determined duration of current time;

identifying a crowd comprising the plurality of consumers by comparing, using a processor of a computer system, the plurality of current locations and a location of an advertisement presentation device to determine that the plurality of consumers are currently within a pre-determined range of the advertisement presentation device;

logging the plurality of consumers in a TAD placement record for a TAD message, wherein the TAD placement record comprises a number of times that each of the plurality of consumers has been presented the TAD message;

identifying a pre-determined formula for calculating a relevancy score of the TAD message with respect to the crowd based on a plurality of profiles of the plurality of consumers;

adjusting, by the processor and based on the TAD placement record, the pre-determined formula by defining a contribution of each of the plurality of profiles to the relevancy score based on the number of times that each of the plurality of consumers has been presented the TAD message;

calculating, by the processor and in response to adjusting the pre-determined formula, the relevancy score of the TAD message with respect to the crowd using the pre-determined formula; and sending, within a pre-determined time of identifying the crowd and in response to identifying the relevancy score meeting a pre-determined criterion, the TAD message to the advertisement presentation device for presenting to the plurality of consumers.

2. The method of claim 1, wherein each of the plurality of profiles comprises a plurality of attributes of a corresponding consumer of the plurality of consumers, the method further comprising:

receiving, from an advertiser of the TAD message, a plurality of weightings each representing relevancy of an attribute of the plurality of attributes with respect to the TAD message; and generating the pre-determined formula based on the plurality of weightings.

3. The method of claim 2, further comprising:

obtaining an advertisement presentation device profile comprising reception quality measures at a plurality of locations within the pre-determined range of the advertisement presentation device; and further adjusting the pre-determined formula based on the advertisement presentation device profile, wherein the contribution of the each of the plurality of profiles to the relevancy score is adjusted based on the advertisement presentation device profile according to a current location of the plurality of locations associated with a mobile device of the plurality of mobile devices used by the corresponding consumer.

4. The method of claim 1, wherein the pre-determined criterion comprises at least one selected from a group consisting of a first requirement for the relevancy score to exceeds a pre-determined threshold and a second requirement to maximize the relevancy score among a plurality of advertisement presentation device messages.

5. The method of claim 1, wherein the TAD message comprises a multimedia message.

6. The method of claim 1, wherein the advertisement presentation device comprises at least one selected from a group consisting of a digital billboard and an audio-based public announcement system.

7. A system for placing targeted advertisement (TAD), comprising:

an advertisement presentation device configured to present a TAD message;

a plurality of mobile devices used by a plurality of consumers and configured to receive location aware service (LAS) from a LAS provider;

a TAD target locator executing on a processor and configured to:

obtain a plurality of current locations of the plurality of mobile devices from the LAS provider, wherein the plurality of current locations are determined by the LAS provider within a pre-determined duration of current time; and identify a crowd comprising the plurality of consumers by comparing the plurality of current locations and a location of the advertisement presentation device to determine that the plurality of consumers are currently within a pre-determined range of the advertisement presentation device;

a TAD agent executing on the processor and configured to:

log the plurality of consumers in a TAD placement record for a TAD message, wherein the TAD placement record comprises a number of times that each of the plurality of consumers has been presented the TAD message;

identify a pre-determined formula for calculating a relevancy score of the TAD message with respect to the crowd based on a plurality of profiles of the plurality of consumers;

adjust, based on the TAD placement record, the pre-determined formula by defining a contribution of each of the plurality of profiles to the relevancy score based on the number of times that each of the plurality of consumers has been presented the TAD message;

calculate, in response to adjusting the pre-determined formula, the relevancy score of the TAD message with respect to the crowd using the pre-determined formula; and send, within a pre-determined time of identifying the crowd and in response to identifying the relevancy score meeting a pre-determined criterion, the TAD message to the advertisement presentation device for presenting to the plurality of consumers; and a repository for storing the plurality of profiles and the TAD message.

8. The system of claim 7, wherein each of the plurality of profiles comprises a plurality of attributes of a corresponding consumer of the plurality of consumers, the TAD agent further configured to:

receive, from an advertiser of the TAD message, a plurality of weightings each representing relevancy of an attribute of the plurality of attributes with respect to the TAD message; and generate the pre-determined formula based on the plurality of weightings.

9. The system of claim 8, wherein the TAD agent is further configured to:

obtain an advertisement presentation device profile comprising reception quality measures at a plurality of locations within the pre-determined range of the advertisement presentation device; and further adjust the pre-determined formula based on the advertisement presentation device profile, wherein the contribution of the each of the plurality of profiles to the relevancy score is adjusted based on the advertisement presentation device profile according to a current location of the plurality of locations associated with a mobile device of the plurality of mobile devices used by the corresponding consumer.

10. The system of claim 7, wherein the pre-determined criterion comprises at least one selected from a group consisting of a first requirement for the relevancy score to exceeds a pre-determined threshold and a second requirement to maximize the relevancy score among a plurality of advertisement presentation device messages.

11. The system of claim 7,
wherein the TAD message comprises a multimedia message, and
wherein the advertisement presentation device comprises at least one selected from a group consisting of a digital billboard and a public announcement system.

12. A non-transitory computer readable storage medium comprising instructions for placing targeted advertisement (TAD) based on a current location of a consumer using a mobile device, that when executed, comprise functionality to:
  obtain, from a location aware service (LAS) provider, a plurality of current locations of a plurality of mobile devices used by a plurality of consumers, wherein the plurality of current locations are determined by the LAS provider within a pre-determined duration of current time;
  identify a crowd comprising the plurality of consumers by comparing, using a processor of a computer system, the plurality of current locations and a location of an advertisement presentation device to determine that the plurality of consumers are currently within a pre-determined range of the advertisement presentation device;
  log the plurality of consumers in a TAD placement record for a TAD message, wherein the TAD placement record comprises a number of times that each of the plurality of consumers has been presented the TAD message;
  identify a pre-determined formula for calculating a relevancy score of the TAD message with respect to the crowd based on a plurality of profiles of the plurality of consumers;
  adjust, based on the TAD placement record, the pre-determined formula by defining a contribution of each of the plurality of profiles to the relevancy score based on the number of times that each of the plurality of consumers has been presented the TAD message;
  calculate, in response to adjusting the pre-determined formula, the relevancy score of the TAD message with respect to the crowd using the pre-determined formula; and
  send, within a pre-determined time of identifying the crowd and in response to identifying the relevancy score meeting a pre-determined criterion, the TAD message to the advertisement presentation device for presenting to the plurality of consumers.

13. The non-transitory computer readable storage medium of claim 12, wherein each of the plurality of profiles comprises a plurality of attributes of a corresponding consumer of the plurality of consumers, wherein the instructions, when executed, further comprise functionality to:
  receive, from an advertiser of the TAD message, a plurality of weightings each representing relevancy of an attribute of the plurality of attributes with respect to the TAD message; and
  generate the pre-determined formula based on the plurality of weightings.

14. The non-transitory computer readable storage medium of claim 13, wherein the instructions, when executed, further comprise functionality to:
  obtain an advertisement presentation device profile comprising reception quality measures at a plurality of locations within the pre-determined range of the advertisement presentation device; and
  further adjust the pre-determined formula based on the advertisement presentation device profile, wherein the contribution of the each of the plurality of profiles to the relevancy score is adjusted based on the advertisement presentation device profile according to a current location of the plurality of locations associated with a mobile device of the plurality of mobile devices used by the corresponding consumer.

15. The non-transitory computer readable storage medium of claim 13, wherein the pre-determined criterion comprises at least one selected from a group consisting of a first requirement for the relevancy score to exceeds a pre-determined threshold and a second requirement to maximize the relevancy score among a plurality of advertisement presentation device messages.

16. The non-transitory computer readable storage medium of claim 13, wherein the TAD message comprises a multimedia message.

17. The non-transitory computer readable storage medium of claim 13, wherein the advertisement presentation device comprises at least one selected from a group consisting of a digital billboard and an audio-based public announcement system.

* * * * *